(12) United States Patent
Erbatov (10) Patent No.: US 9,618,754 B2
(45) Date of Patent: Apr. 11, 2017

(54) OPTICAL SYSTEM FOR FORMING NON-CIRCULAR IMAGE OF LIKE-WISE SHAPED LIGHT SOURCE ON WORKPIECE LOCATED IN WAIST OF LASER BEAM

(71) Applicant: IPG PHOTONICS CORPORATION, Oxford, MA (US)

(72) Inventor: Timur Erbatov, Burbach (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/551,152

(22) Filed: Nov. 24, 2014

(65) Prior Publication Data

US 2015/0077847 A1    Mar. 19, 2015

(30) Foreign Application Priority Data

May 29, 2013   (WO) ................ PCT/US2013/043045

(51) Int. Cl.
| | |
|---|---|
| *G02B 23/00* | (2006.01) |
| *G02B 27/09* | (2006.01) |
| *G02B 13/00* | (2006.01) |
| *B23K 26/06* | (2014.01) |
| *B23K 26/073* | (2006.01) |

(Continued)

(52) U.S. Cl.
CPC ........ *G02B 27/0955* (2013.01); *B23K 26/064* (2015.10); *B23K 26/0648* (2013.01); *B23K 26/0652* (2013.01); *B23K 26/0732* (2013.01); *B23K 26/08* (2013.01); *B23K 26/20* (2013.01); *G02B 6/262* (2013.01); *G02B 13/0005* (2013.01); *G02B 27/0927* (2013.01); *G02B 6/2746* (2013.01); *H01S 3/005* (2013.01)

(58) Field of Classification Search
CPC ........ G02B 13/00; G02B 23/00; G02B 15/00; G02B 23/145; G02B 23/14; G02B 23/2446; G02B 3/00; G02B 13/0005; G02B 13/08; H01S 5/141; H01S 5/005; H01S 3/02
USPC ....... 359/362, 399, 421, 422, 423, 432, 434, 359/435, 642, 662, 668, 670, 671; 372/92, 101, 108, 109
See application file for complete search history.

(56) References Cited

U.S. PATENT DOCUMENTS

2008/0151951 A1 * 6/2008 Elliott ................ B29C 67/0066
                                                  372/24
2011/0249319 A1 * 10/2011 Savage-Leuchs .. G02B 6/02347
                                                  359/341.1

* cited by examiner

*Primary Examiner* — Stephone B Allen
*Assistant Examiner* — Rahman Abdur
(74) *Attorney, Agent, or Firm* — Yuri B. Kateshov, Esq.; Timothy J. King, Esq.

(57) ABSTRACT

An optical system for forming a final image of a non-circular light source on a workpiece with a desired non-circular cross-section and desired size B includes a plurality of spaced lenses. The plurality of lenses are arranged with spaced upstream and downstream lenses which are configured to transmit the beam emitted by the light source. The optical system is configured with an F-theta lens spaced downstream from the downstream lens and converging the beam incident thereon so that the beam has a final waist. The F-theta and downstream lenses are spaced apart so that $$\frac{F4}{Fth} = \frac{A}{B},$$

wherein F4 a positive focal length of the downstream lens, Fth is the negative focus of the F-theta lens, B is the desired (Continued)

size of the final image, and A is a size of a preliminary noncircular image of the source different from the desired size B.

5 Claims, 5 Drawing Sheets

(51) Int. Cl.
    *B23K 26/08*          (2014.01)
    *B23K 26/20*          (2014.01)
    *B23K 26/064*        (2014.01)
    *G02B 6/26*           (2006.01)
    *H01S 3/00*           (2006.01)
    *G02B 6/27*           (2006.01)

| Lens | Separation, mm | Focal length, mm | Image position, mm | Waist position, mm | Divergence, mrad | Waist diameter, mm | Rayleigh range, mm | Beam dia. at next lens, mm | Image−waist displacement, % (RL) |
|---|---|---|---|---|---|---|---|---|---|
|  |  |  |  |  | 230 | 0.2 | 0.870 | 4.8 |  |
| 88 | 20 | 40,00 | −40,000 | −39,849 | 115,109 | 0,400 | 3,472 | 5,063 | 4.3 |
| 88' | 4,000 | 40,00 | 440,000 | 269,213 | 14,916 | 3,084 | 206,742 | 3,170 | −82.6 |
| 90 | 220,000 | 82,00 | 59,735 | 67,285 | 44,543 | 1,033 | 23,185 | 2,978 | 32.6 |
| 102 | 130,000 | −22.25 | −16,899 | −16,827 | 176,312 | 0.261 | 1,480 | 11,876 | 4.8 |
| 98 | 50,513 | 67.34 | 63286,430 | 67,340 | 3,874 | 11,873 | 3064,452 | 11,884 | −2063.0 |
| 112 | 200,000 | 163.00 | 162,580 | 162,914 | 72,843 | 0.631 | 8.6669 |  | 3.9 |

OPTICAL SYSTEM FOR FORMING NON-CIRCULAR IMAGE OF LIKE-WISE SHAPED LIGHT SOURCE ON WORKPIECE LOCATED IN WAIST OF LASER BEAM

BACKGROUND OF THE DISCLOSURE

Field of the Disclosure

The disclosure relates to optical systems and more particular, the disclosure relates to a laser beam delivering system capable of transmitting a non-circular light beam emitted by a likewise shaped light source to the desired location and with the desired intensity.

Background of the Disclosure

Up until recently the core geometry of fiber optics has almost exclusively been circular. With new geometrical possibilities differing from a circular design, current fiber optic cables are not only transporting the laser light to the work piece, but can also take an active part in the system design reducing the need for beam shaping optics. For example, a fiber core with a square cross-section delivering a square beam is attractive in various high power applications such as welding and heat treatment applications because it processes the material more uniformly as it moves laterally along the surface compared to a circular beam.

Referring to FIGS. 1A-1D, one of the known beam transmitting schemes includes a pigtailed optical isolator 10. Isolators are optical devices that allow light to be transmitted in one direction only. They are most often used to prevent back reflected light from entering the source. Particularly, but not exclusively, isolator 10 is important when used in high power pulsed fiber laser systems with a master oscillator/power amplifier ("MOPA") configuration which is very sensitive to high power backreflected light.

Figure 1A:
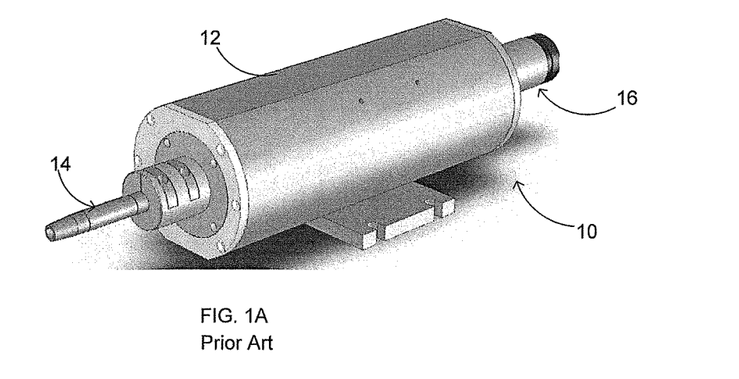
FIG. 1A is a perspective view of isolator configured in accordance with the known art.
Figure 1B:
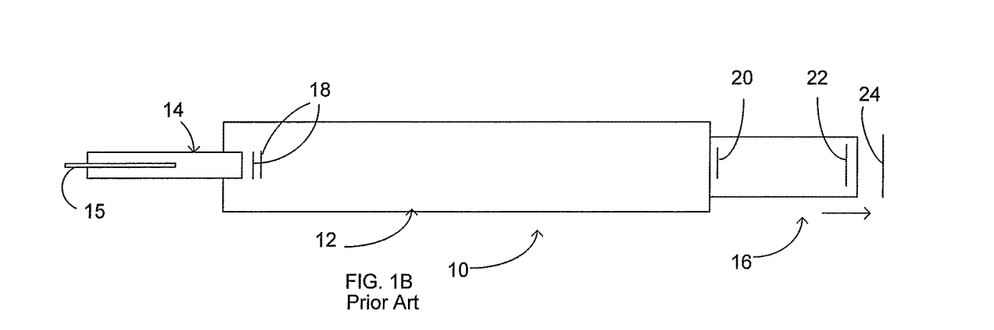
FIG. 1B is an elevated sectional view of the isolator of FIG. 1A.
Figure 1C:
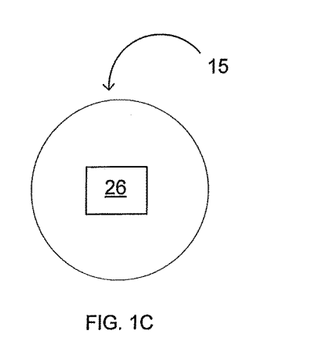
FIG. 1C is an exemplary cross-section of delivery fiber having a core which is configured with a non-circular cross-section.

Referring to FIG. 1B, isolator 10 includes a housing 12 provided with, among others, a fiber connector 14 at its upstream end and a telescope 16 at its downstream end. The connector 14 receives a delivery fiber 15 including a cladding, and a core 26, which can have any cross-section differing from a circular one, such as a square cross-section shown in FIG. 1C. The fiber 15 delivers amplified light to isolator 10 where the light is first collimated at the input of housing 12 by a lens assembly 18. The collimated beam then propagates in free space through the core of the isolator (not shown) and is eventually magnified by telescope 16 which includes a plano-concave negative lens 20 mounted close the output end of housing 12, and a plano-convex positive lens 22 mounted to the telescope's output end. Seemingly a square-shaped image of core 26 would appear on a workpiece placed in a focal plane of F-theta lens 24. However, it is not the case, as disclosed below.

Figure 1D:
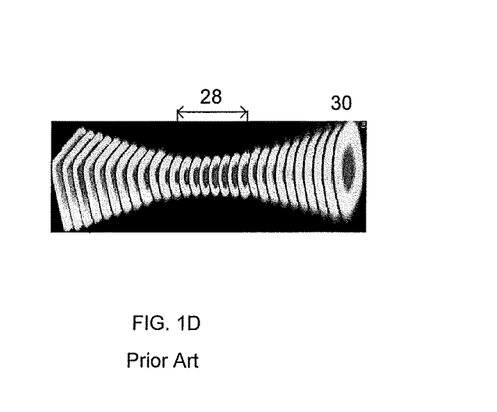
FIG. 1D is a computer generated image of a square fiber core used in the system shown in FIGS. 1A-1C.

FIG. 1D illustrates the circular image of core 26 on the workpiece located within a Rayleigh range ("RR") 28 and substantially coinciding with a waist 30 of the output laser beam. The desired, square-shaped core image is formed in a plane spaced from waist 30 of the beam with the latter being the highest optical intensity region. Yet, as discussed above, both the square image and highest intensity of the beam incident on the workpiece, which is located in a focal plane, are often required for effectively performing the task at hand.

A need therefore exists for an imaging optical system delivering a laser beam with a non-circular cross-section fiber on the workpiece to be processed with the desired intensity.

Another need exists for an imaging optical system operative to invariably place the image of a non-circular fiber core within the RR of the emitted laser beam.

Still a further need exists for a kit including a pigtailed optical component and imaging system which are configured to detachably couple to one another so as to obtain a non-circular image of the likewise shaped fiber core on a workpiece located within the RR.

Another need exists for pigtailed bulk optics provided with an optical system which is operative to focus an image of the non-circular fiber core with the desired maximum intensity on a workpiece located within the RR of the laser beam.

These needs are met by this disclosure as briefly disclosed immediately below.

SUMMARY OF THE DISCLOSURE

According to one aspect, the disclosed optical system is configured with an image-forming optical system including a combination of five lenses. The lenses are selected so that the image of a light source, for example non-circular fiber core, with the desired spot size is formed in a focal plane, i.e. the image substantially coincides with a beam waist.

The lenses are spaced apart along a light path and have respective optical characteristics which allow first to place a non-circular image and waist in a focal plane of one of intermediary lenses, and then modify the spot size of the image to the desired one. The placement of the non-circular image in an intermediary waist is provided by a combination of three upstream lenses which sequentially transform a collimated beam, incident on the first upstream lens, so as to have the waist of the beam and non-circular image substantially coincide. However, the obtained initial image does not have the desired spot size.

To bring the initial spot size to the desired one, spaced fourth and fifth lenses are located along the path downstream from the third lens. The last, fifth downstream lens is an F-theta lens. These two lenses are configured to comply with the following equation:

$$A/B = F_4/F_5, \tag{1}$$

wherein A and B are respective spot sizes of the initially received non-circular image and desired spot size, and F4 and F5 are respective focal lengths. The desired spot size of the image corresponds to the beam intensity sufficient to effectively treat a workpiece.

In accordance with a further aspect of the disclosure, a pigtailed optical component includes an image forming system configured to form the square-shaped image of the fiber's core at the desired location and with the desired intensity. The image forming system includes a combination of five spaced coaxial lenses. The two downstream lenses are configured to adjust a spot size of previously formed square-shaped image to the desired one at the desired location in accordance with equation (1).

Still another aspect of the disclosure relates to a kit including an optical component provided with an image forming system reproducing the image of a circular light source and another image system that can be coupled to the optical component and operative to form the desired image of a non-circular source of light at the desired location.

BRIEF DESCRIPTION OF THE DRAWINGS

The above and other aspects, features and advantages of the disclosure will become more readily apparent with the aid of the following drawings, in which.

SPECIFIC DESCRIPTION

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

In free space between lenses, mirrors and/or other optical elements, the position of the beam waist and the waist diameter completely describe the beam. As a beam passes through a lens, mirror, or dielectric interface, the wavefront curvature is changed, resulting in new values of the waist position and waist diameter. This optical phenomenon makes the following description more clear.

Figure 2:
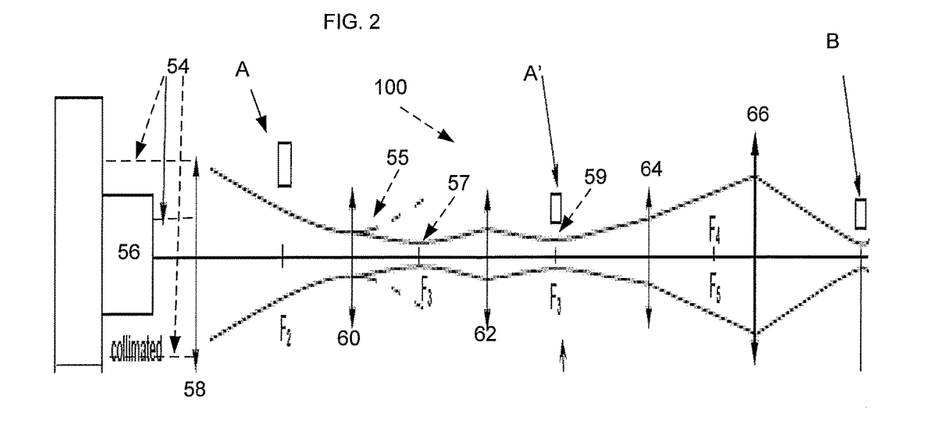
FIG. 2 is an optical scheme configured in accordance with the disclosure.

FIG. 2 illustrates the disclosed imaging system 100 configured to form the desired non-circular image of a non-circular light source with the desired intensity. For example, the light source may be an optical fiber with the core having any cross-section which differs from a circular one. The system 100 includes a plurality of spaced lenses configured to initially form the non-circular image in a beam waist formed between intermediary lenses and not having the desired spot size, and then adjust this size to the desired one which is formed in the focal plane of an F-theta lens.

The initial non-circular image having a spot size differing from the desired one B, is formed by a combination of three lenses 58, 60 and 62, respectively, which are sequentially spaced from one another along a light path. The diverging beam 54 emitted by a non-circular source is incident on an upstream first positive lens 58 that can be positioned immediately downstream from the output of an optical element or spaced therefrom at a distance of hundreds of millimeters. For positive lens 58, refraction of light brings the beam to a point A (real image) spaced upstream from a first beam waist 55. The intensity of the thus formed image is not acceptable for performing the task at hand.

To gradually form the desired, final non-circular image with the desired intensity, second positive lens 60 is placed in first beam waist 55 and configured so as to have its back focus coincide with the image A. Such a configuration, as known to one of ordinary skill in the art, forms the image of the source in the infinity.

The third lens 62 is configured with a back focus formed in the plane of second waist 57 of the beam incident on second lens 60. This configuration results in a third beam waist 59 of the beam, which is incident on third lens 62, substantially coinciding with the real preliminary non-circular image of the source in focal plane F3 of lens 62. The third lens 62 is however configured with a short focal length so that the preliminary image has the spot size A' which is different from the desired size B. In other words, the light intensity of the beam spot in focal point F3 is different from the desired one.

The formation of the desired spot with size B requires a combination of two additional lenses 64 and 66, respectively, with the latter being an F-theta lens. The fourth lens 64 may be positioned anywhere in the beam downstream from the 3rd waist 59 provided that the following relationship is met:

$$A/B = F_4/F_5 \quad (2)$$

where A and B are the spot sizes of the preliminary formed image and desired final image, respectively, and F4 and F5 are respective focal lengths, with F5 being fixed. The only variable to be determined here is F4. Accordingly, $$F4 = F_5 A/B \quad (3)$$

Figure 3:
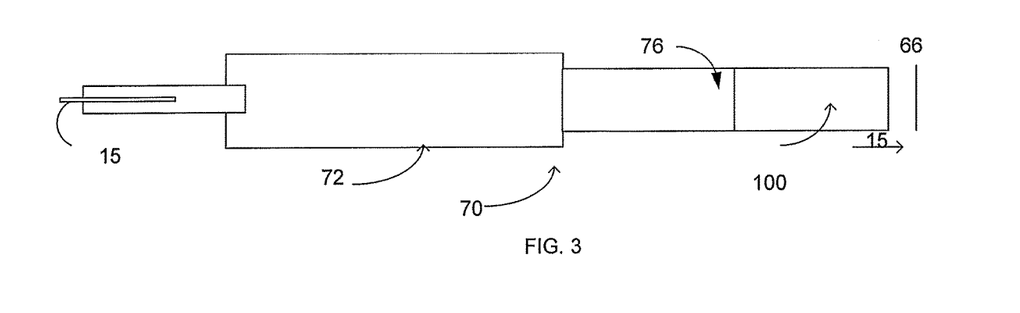
FIG. 3 is a diagrammatic view of the disclosed scheme of FIG. 2.

FIG. 3 diagrammatically illustrates one possible application of system 100 of FIG. 2. In particular, an optical fiber 15 has a non-circular core delivering light to an optical isolator assembly 70. The isolator has a standard structure similar to that one of FIG. 1 and includes a housing 72, one or two collimating lenses which direct the beam to the isolator core and a telescope assembly 76 that includes two lenses adjusting the size of the beam. The adjusted beam is incident on a F-theta lens 66. The imaging system 100 of FIG. 2 is coupled to the output of telescope assembly 76 immediately upstream from F-theta lens 66. The illustrated structure is operative to form the desired final image of the non-circular fiber core at the desired location which may be spaced from the waist within a 1-10% of the entire length of a Rayleigh range ("RR"). The RR is the axial distance from the beam waist Wo, which is the smallest beam diameter, to the point where the beam diameter has increased to √2Wo. However, the illustrated structure may not be user friendly because of an 8-9 lens system making the structure cumbersome and cost associated with manufacturing of numerous lenses.

It should be understood that the optical isolator of FIG. 2 (and thus all other figures) can be replaced by any optical component configured to emit coherent light with a non-circular cross-section. Also, system 100 of FIG. 2 is equally effective with a source different from the fiber core.

Figure 4:
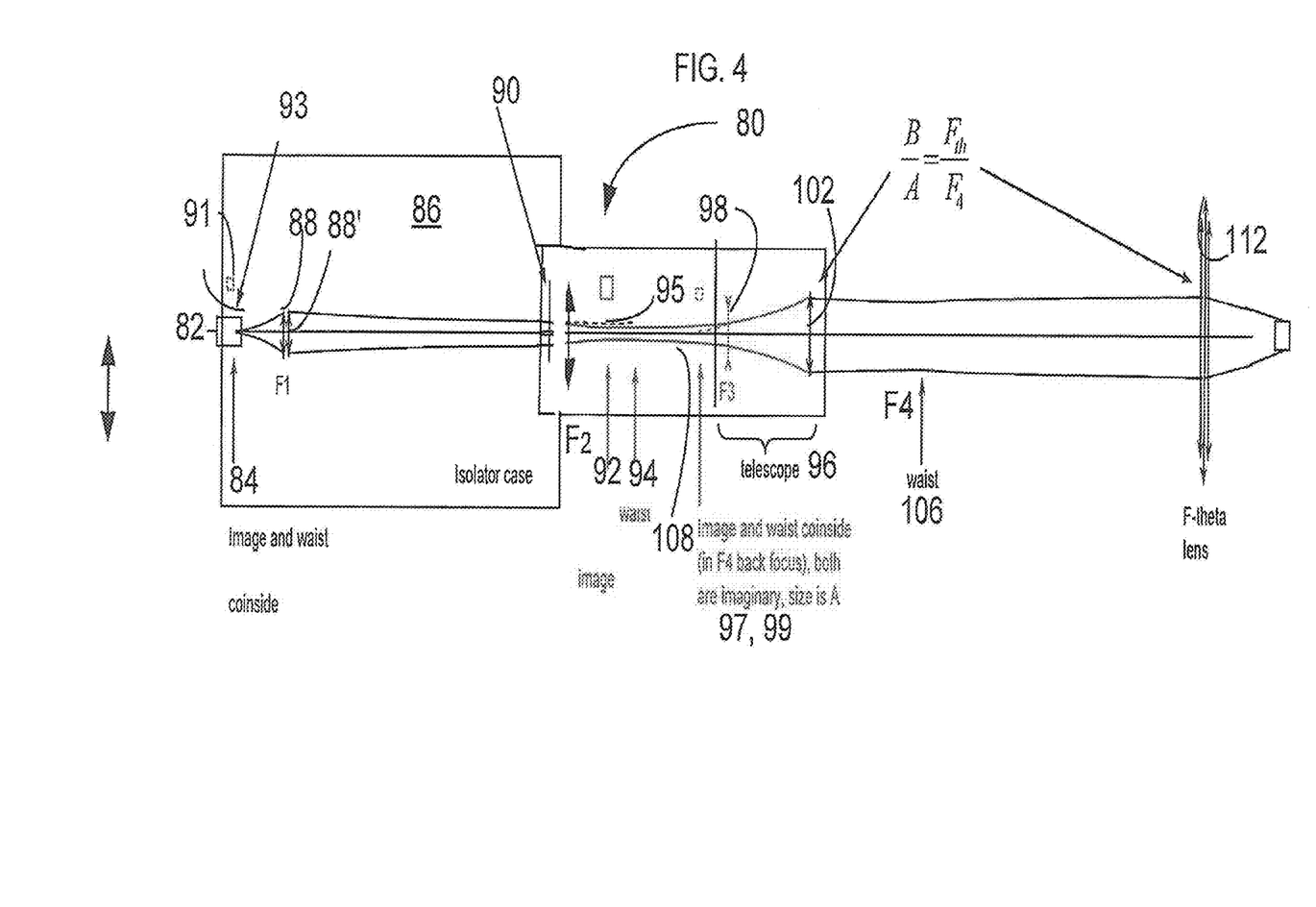
FIG. 4 is an optical scheme of another embodiment illustrating the formation of images and beams by the disclosed system.
Figure 5:
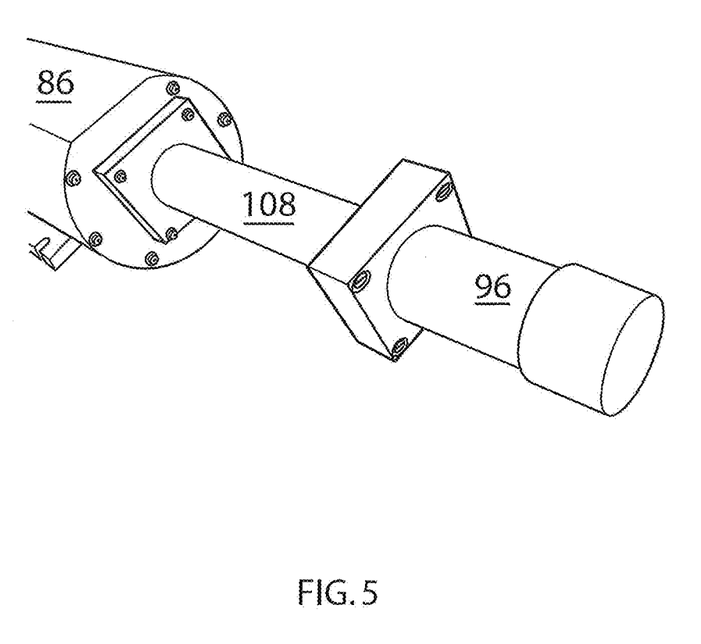
FIG. 5 is a perspective view of the system of FIG. 4.
Figure 6:
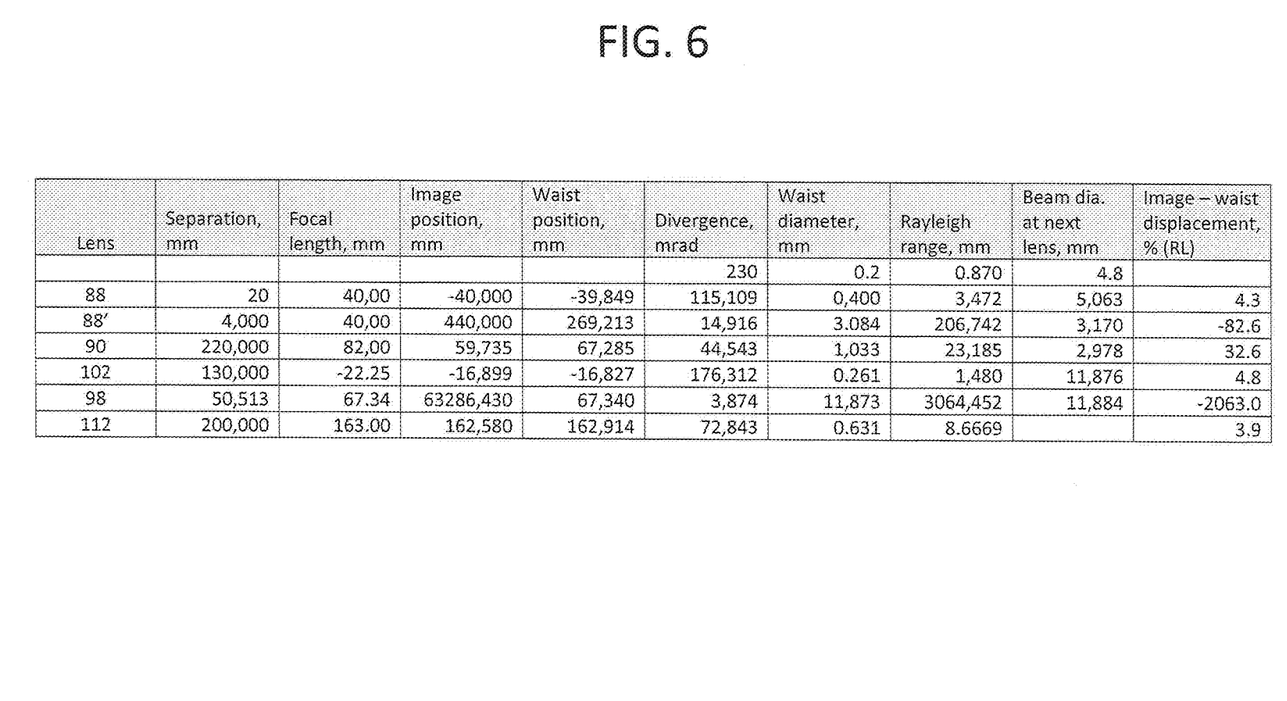
FIG. 6 is table illustrating physical and optical parameters of the embodiment of FIG. 4.

FIGS. 4-6 illustrate a further embodiment of an imaging system specifically configured to form a non-circular image of a likewise shaped light source with the desired intensity. FIG. 5 illustrates an experimental device based on the schematic of FIG. 4. FIG. 6 illustrates calculated results.

The illustrated configuration includes a pigtailed isolator 80 with a housing 86 enclosing a collimating unit. The isolator 80 further has a telescope assembly 96, F-theta lens 112 and insert 108. The opposite ends of insert 108 are removably mounted to respective housing 86 and telescope assembly 96.

The downstream end of delivery fiber 82 is received in a coupler 93, which is mounted to housing 86, and emits, for example, a non-circular beam having divergence of 230 mrad with a waist diameter of 0.2 mm and RR of 0.870 (See FIG. 6). The housing 86 of isolator 80 encloses a first positive lens 88 receiving light from a fiber 82 and configured to collimate it. The lens 88 is spaced from the downstream end of fiber 82 at a distance of about 20 mm which is smaller than the focal length of 40 mm of this lens. An optional additional lens 88 is adjacent to lens 88 and spaced therefrom, for example, at 4 mm. Such a configuration places image 91 of the fiber's square core of fiber 82 within the narrowest region 84 of the emitted beam with a divergence 115,109 mrad as shown in FIG. 6. In other words, waist 84 practically coincides with non-circular image 91 at the output of fiber 82.

The close position of upstream lenses 88 and 88' theoretically forms a collimated beam, but, in reality, the beam is slightly focused so that a waist 95 shown in dash lines is formed at a distance corresponding to 269,213 mm. The non-circular initial image 94 is however formed at a distance from waist 95 at 440,000 mm (FIG. 6) from lens 88' (FIG. 4). The lenses 88 and 88' can be configured as a single lens with a prominent curvature.

The displacement of the image and waist relative to one another at a predetermined distance, i.e., the distance sufficient to place the image in the desired 5% sub-region of the RR, is realized by providing insert 108 with a positive lens 90. The insert 108 has its opposite ends coupled to housing 86 and telescope, respectively so that new lens 90 occupies the same position as an upstream lens 98 of telescope 96 would occupy in the originally designed isolator without insert 108. In this example, lens 90 is spaced from lens 88' at 220 mm, has a focal length of 40 mm and shapes the beam incident thereupon so that image 92 is formed at 59,736 mm, whereas waist 94 is removed from lens 90 at 67,286 mm.

The beam is further incident on negative lens 98 of telescope 96 which is spaced downstream from lens 90 at 130 mm and having −22,25 mm focal length (FIG. 6). The lens 98 is configured to form imaginary image 97 and imaginary waist 99 practically in the same plane upstream from lens 98. In particular, as indicated in FIG. 6, imaginary image 97 is spaced from lens 98 at −16,899 mm whereas waist 99 at −16,827 mm. The imaginary image 97 provides information about its size A which is different from the desired size B, and thus, should be adjusted and placed in the focal plane of F-theta lens 112. The working distance, in turn, is determined in accordance with equations 1 and 2, as disclosed above. In particular, knowing the focal length of F-theta lens Fth, and both imaginary and desired image sizes A and B, respectively, the focal length f4 of lens 102 is determined as $$F4 = \frac{FthA}{B}.$$

With the determined focal length of lens 102, F-theta lens 112 can be displaced relative lens 102 so as to satisfy the A/B=F4/F5 relationship. Thus in order to receive the desired non-circular image in the focal plane of F-theta lens 112, an optical system should meet the following conditions. The first condition requires the formation of negative or imaginary non-circular image in a corresponding waist upstream from the output positive lens of the telescope. Under the second condition displacement of the system and a F-theta lens relative to one another should be such that the distance between the output telescope lens and F-theta lens is equal to a sum of their respective focal lengths. This embodiment, like the configuration of FIG. 3, may be packaged as a kit with insert 108, isolator 86 and telescope 96 (FIG. 5) used either together specifically for the formation of the desired square image or just the isolator/telescope configuration for circular cores.

Those skilled in the art will recognize or be able to ascertain using no more than routine experimentation many equivalents to the specific embodiments of the invention described herein. The disclosed schematics can be used with any light imaging system, but the impetus for the presently disclosed structure lies in high power fiber laser systems. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

The invention claimed is:

1. An optical system for forming a final image of a non-circular light source, outputting a beam along a path, on a workpiece, wherein the final image has a desired non-circular cross-section and a desired size B, the optical system comprising:
   a positive lens processing the beam such that an initial waist of the beam and an initial non-circular image of the non-circular light source are formed along the path with the initial non-circular image being spaced downstream from the waist at a desired distance;
   an optical telescope including spaced upstream and downstream lenses which are located along the path downstream from the initial non-circular image, the upstream lens being configured to form an imaginary image of the non-circular light source and an imaginary waist of the beam, wherein the desired distance between the initial image and waist is such that the imaginary image and waist are substantially coplanar upstream from the downstream lens, the imaginary image being formed with a size A different from the desired size B; and
   an F-theta lens spaced downstream from the downstream lens of the telescope along the path so that $$\frac{F4}{Fth} = \frac{A}{B},$$

with F4 and Fth being focal lengths of respective downstream and F-theta lenses, wherein the F-theta lens converges the beam incident thereon so that the final image and a final waist of the converged beam are formed such that the final image is formed in a focus of the F-theta lens and spaced from the final waist at a distance d1 not exceeding ±5% of the Rayleigh range.

2. The system of claim 1, wherein the upstream lens of the telescope is negative.

3. A kit comprising:
   at least one upstream lens converging a beam from a non-circular light source such that an initial image of the non-circular light source and an initial waist of the beam are spaced from one another along a path;

intermediary upstream and downstream lenses forming an optical telescope downstream from the initial waist and initial image, and an F-theta lens spaced downstream from the telescope; and a positive lens insertable between the upstream lens and telescope and in optical communication therewith, the positive lens being configured to space the initial image and initial waste from one another at a desired distance, the intermediary upstream lens of the telescope being a negative lens configured to form an imaginary image of the non-circular light source and an imaginary waist of the beam, wherein the desired distance between the initial image and initial waist is such that the imaginary image and waist are substantially coplanar upstream from the downstream lens of the telescope, wherein the intermediary image has a size A different from a desired size of the non-circular light source on a workpiece, the F-theta lens being operative to transmit the beam so that the beam has a final waist downstream from the F-theta lens and form a final image of the non-circular light source having a desired size B in a focus of the F-theta lens and spaced from the final waist at a distance d1 not exceeding ±5% of the Rayleigh range provided that $$\frac{F4}{Fth} = \frac{A}{B},$$

wherein F4 a positive focal length of the downstream lens of the telescope, Fth is a negative focal length of the F-theta lens.

4. The kit of claim 3 further comprising a pigtailed optical component configured with:
   a first housing which encases the upstream lens of the first optical system,
   a second housing spaced from the first housing and encasing the telescope and the F-theta lens, and
   a third housing coupled to the first and second housings and enclosing the positive lens.

5. The kit of claim 3 further comprising an additional upstream lens.

* * * * *